Figure 1:
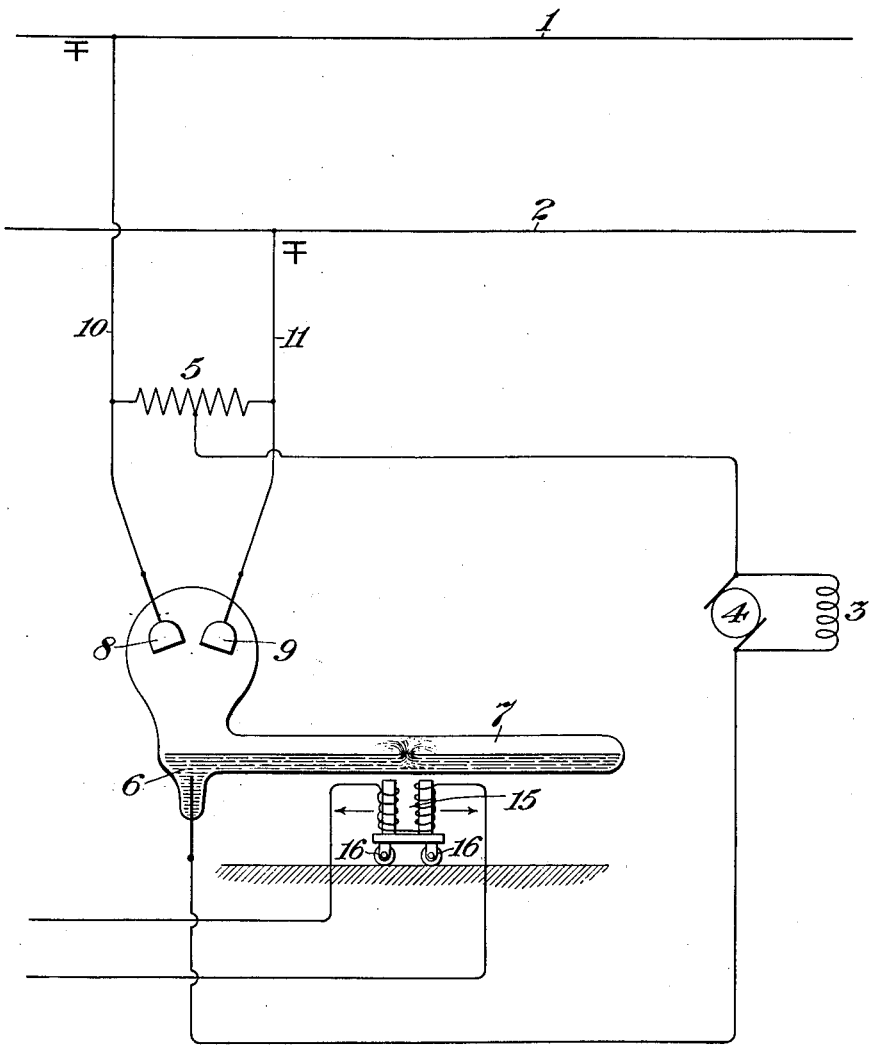

P. H. THOMAS.
SYSTEM OF ELECTRICAL CONTROL.
APPLICATION FILED JUNE 19, 1905.

916,223.

Patented Mar. 23, 1909.
2 SHEETS—SHEET 1.

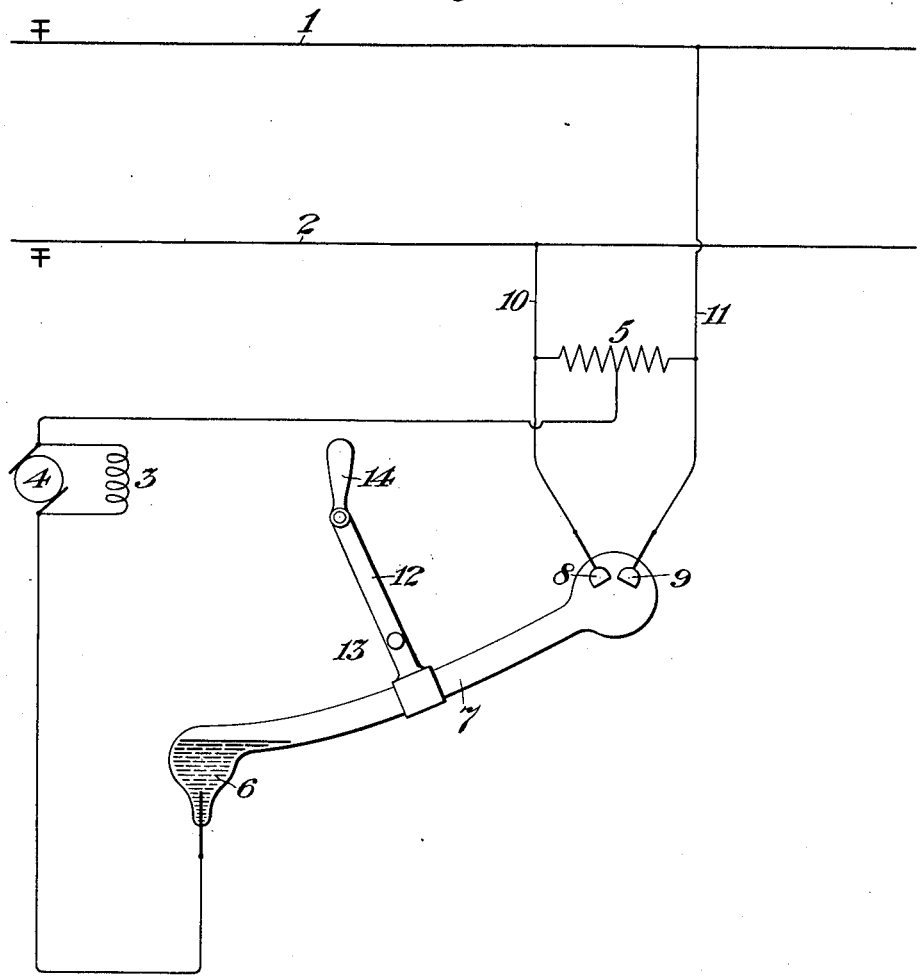

UNITED STATES PATENT OFFICE.

PERCY H. THOMAS, OF EAST ORANGE, NEW JERSEY, ASSIGNOR TO COOPER HEWITT ELECTRIC COMPANY, OF NEW YORK, N. Y., A CORPORATION OF NEW YORK.

SYSTEM OF ELECTRICAL CONTROL.

No. 916,223.   Specification of Letters Patent.   Patented March 23, 1909.

Application filed June 19, 1905. Serial No. 265,888.

*To all whom it may concern:*

Be it known that I, PERCY H. THOMAS, a citizen of the United States, and resident of East Orange, county of Essex, State of New Jersey, have invented certain new and useful Improvements in Systems of Electrical Control, of which the following is a specification.

It has been proposed to utilize in the circuit between an electrical supply system and a work circuit, a vapor electric device having the property of maintaining across its terminals an approximately constant voltage independent of the current voltage. By using such a device, the subtraction of potential from the supply circuit before it is delivered to the work circuit is a constant factor provided the conditions in the vapor device remain constant. It is known, however, that the constant potential which is thus maintained upon the terminals of the vapor apparatus is dependent upon the length of the vapor path, that is to say, upon the distance between the positive electrode and the point at which the current enters the negative electrode. By varying, then, the length of the vapor path, the voltage which is to be subtracted from the supply voltage may be itself varied at will. As one means for adjusting the length of the vapor path, it has been proposed to tilt the vapor device so that the liquid positive electrode might be brought nearer to or farther away from the fixed positive electrode. There is, of course, no inherent reason why both electrodes should not be movable nor why the movement of the container of the device should not act upon both electrodes to move them nearer together or farther apart. Another means for accomplishing the same result consists of a movable magnet which by its position determines the point at which the current traversing the device shall enter the negative electrode, thereby determining the length of the vapor path traversed by the current. This function of a magnet for determining the entrance point of current to the negative electrode is described in United States Patent No. 749,793 issued January 19, 1904 to Peter Cooper Hewitt.

So far as I am aware, the application of the vapor device in the manner described has heretofore been suggested only for direct current work. The present invention contemplates the application of the same apparatus and the same principle of operation to alternating current circuits. For convenience, I have illustrated the device in connection with a varying speed motor supplied with direct current from an alternating current source. Two modes of embodying this principle are illustrated in the diagrams shown in Figures 1 and 2 of the drawings.

Referring to the first figure of the drawing, 1 and 2 are electric mains supplied with current from an alternating current source, 3 and 4 are, respectively, the field magnet and armature of a direct current motor supplied from the said mains. One terminal of the said motor is connected with an intermediate point on an induction device, 5, connected between the said mains, while the other terminal is connected to the negative electrode 6, of a vapor device, 7. The two positive electrodes, 8 and 9, of the said vapor device are connected by wires 10 and 11, respectively, with the mains 2 and 1.

The organization thus far described is capable of transmitting through the vapor device 7 to the electric motor 3—4 a direct current capable of operating the same. To vary the speed of the motor a clamping arm, 12, pivoted at 13 and supporting the vapor device 7 may be turned upon its pivot by means of a handle, 14, so as to bring the mercury constituting the negative electrode 6 into closer or more remote relation to the positive electrodes 8 and 9, thus varying the length of the vapor column at will. In Fig. 1 the same result is accomplished by the use of a movable magnet, 15, mounted on wheels or rollers, 16, or otherwise made adjustable along the entire length of the mercury electrode 6. Inasmuch as the position of the magnet 15 determines the point at which the current traversing the vapor device 7 enters the negative electrode, it is manifest that the length of the vapor column is subject to ready control.

It will be understood that while the regulation herein described applies primarily to the use of a variable vapor resistance controlling alternating current circuits, yet some of the features of the invention relate not only to a device applied to such a use but to a vapor device connected to a work circuit and any suitable source of supply, whether alternating or direct.

I claim as my invention:—

1. In a system of electrical distribution the combination with a work circuit and an alternating current supply, of a vapor rectifier comprising an hermetically sealed and completely exhausted container and suitable electrodes therefor, one of which is a vaporizable reconstructing cathode, said rectifier supplying direct current to said work circuit from said supply, together with means whereby the vapor column of said rectifier may be given different effective lengths independent of the current flowing.

2. In a system of electrical distribution the combination with a work circuit and an alternating current supply, of a vapor rectifier comprising an hermetically sealed and completely exhausted container, including a plurality of anodes and a vaporizable reconstructing cathode, said rectifier delivering direct current to said work circuit from said alternating supply, together with means whereby the length of the vapor path between the several anodes and a cathode may be effectively lengthened independent of the current flowing.

3. In a system of electrical distribution the combination with a work circuit and an alternating current supply, of a vapor rectifier comprising an hermetically sealed and completely exhausted container and suitable electrodes therefor, one of which is a vaporizable reconstructing cathode, said rectifier supplying direct current to said work circuit from said supply, together with means whereby the said rectifier may be tilted to give different effective lengths of vapor column independent of the current flowing.

Signed at New York, in the county of New York, and State of New York, this 15th day of June, A. D. 1905.

PERCY H. THOMAS.

Witnesses:
WM. H. CAPEL,
GEORGE H. STOCKBRIDGE.